United States Patent [19]
Perry

[11] Patent Number: 5,829,096
[45] Date of Patent: Nov. 3, 1998

[54] LOCKING CASTER

[76] Inventor: Eugene D. Perry, 91 Morgan St., Mooresville, Ind. 46158

[21] Appl. No.: 592,964

[22] Filed: Jan. 29, 1996

[51] Int. Cl.$^6$ ..................................................... B60B 33/00
[52] U.S. Cl. ............................................................ 16/35 R
[58] Field of Search .......................... 16/35 R; 188/1.12; 182/39, 107

[56] References Cited

U.S. PATENT DOCUMENTS

| | | | |
|---|---|---|---|
| 1,733,536 | 10/1929 | Guitschula | 16/35 R |
| 1,778,167 | 10/1930 | Roe | 16/35 R |
| 2,227,832 | 1/1941 | Herold | 16/35 R |
| 2,434,863 | 1/1948 | Parkhill | 16/35 R |
| 3,239,873 | 3/1966 | Fisher . | |
| 3,396,817 | 8/1968 | Perry . | |
| 3,985,208 | 10/1976 | Libhart | 16/35 R |
| 4,262,774 | 4/1981 | Chez . | |
| 4,336,630 | 6/1982 | Page | 16/35 R |
| 4,793,438 | 12/1988 | Perry . | |
| 5,012,550 | 5/1991 | Schlosser | 16/35 R |
| 5,390,761 | 2/1995 | Perry . | |
| 5,509,506 | 4/1996 | Jones | 16/35 R |

FOREIGN PATENT DOCUMENTS

| | | | |
|---|---|---|---|
| 2340108 | 2/1975 | Germany | 16/35 R |
| 4221542 | 1/1993 | Germany | 188/1.12 |
| 1102262 | 2/1968 | United Kingdom | 16/35 R |
| 2155321 | 9/1985 | United Kingdom | 16/35 R |

OTHER PUBLICATIONS

Indy Caster caster, eleven (11) color photographs denoted as Figs. 1–11 in photograph sheet Nos. 1–3. Fig. 1 is a side elevational view of the caster in the unlocked position, Fig. 2 is a rear view of the caster in the unlocked position, Figs. 3–5 and 11 are front views of the caster in the unlocked position, Fig. 6 is a side elevational view of the caster in the locked position, Figs. 7 and 10 are rear views of the caster in the locked position, and Figs. 8 and 9 are front views of the caster in the locked position.

Up–Right caster, six (6) color photographs denoted as Figs. 1–6 in photograph sheet No. 4. Fig. 1 is a side elevational view of the caster in the unlocked position, Fig. 2 is a side elevational view of the caster between the unlocked and locked positions, Figs. 3 and 4 are rear views of the caster in the locked position, Fig. 5 is a front view of the caster in the locked position, and Fig. 6 is a perspective view of the caster in the locked position.

*Primary Examiner*—Chuck Mah
*Assistant Examiner*—Donald M. Gurley
*Attorney, Agent, or Firm*—Barnes & Thornburg

[57] ABSTRACT

A caster is provided that includes a wheel rotatable about a wheel axis of rotation, a housing, a locking arm linked to the housing, and a locking bar linked to the housing. The housing includes a housing side wall and a housing detent formed in the housing side wall. The locking arm is movable between an unlocked position to permit the wheel to rotate about its wheel axis of rotation and a locked position to prevent or substantially restrict rotation of the wheel about its wheel axis of rotation. The locking arm is linked to the wheel so that movement of the locking arm between the locked and unlocked positions moves the wheel. The locking arm includes a locking arm side wall and a flared portion formed in the locking arm side wall and extending outwardly toward the housing side wall, the flared portion is engaged with the housing detent when the locking arm is in the locked position and disengaged from the housing detent when the locking arm is in the unlocked position. The locking bar includes a brake facing toward the wheel and engaging the wheel when the locking arm is situated in the locked position to prevent or substantially restrict rotation of the wheel about its wheel axis of rotation. The brake is an indentation formed in the locking bar.

18 Claims, 2 Drawing Sheets

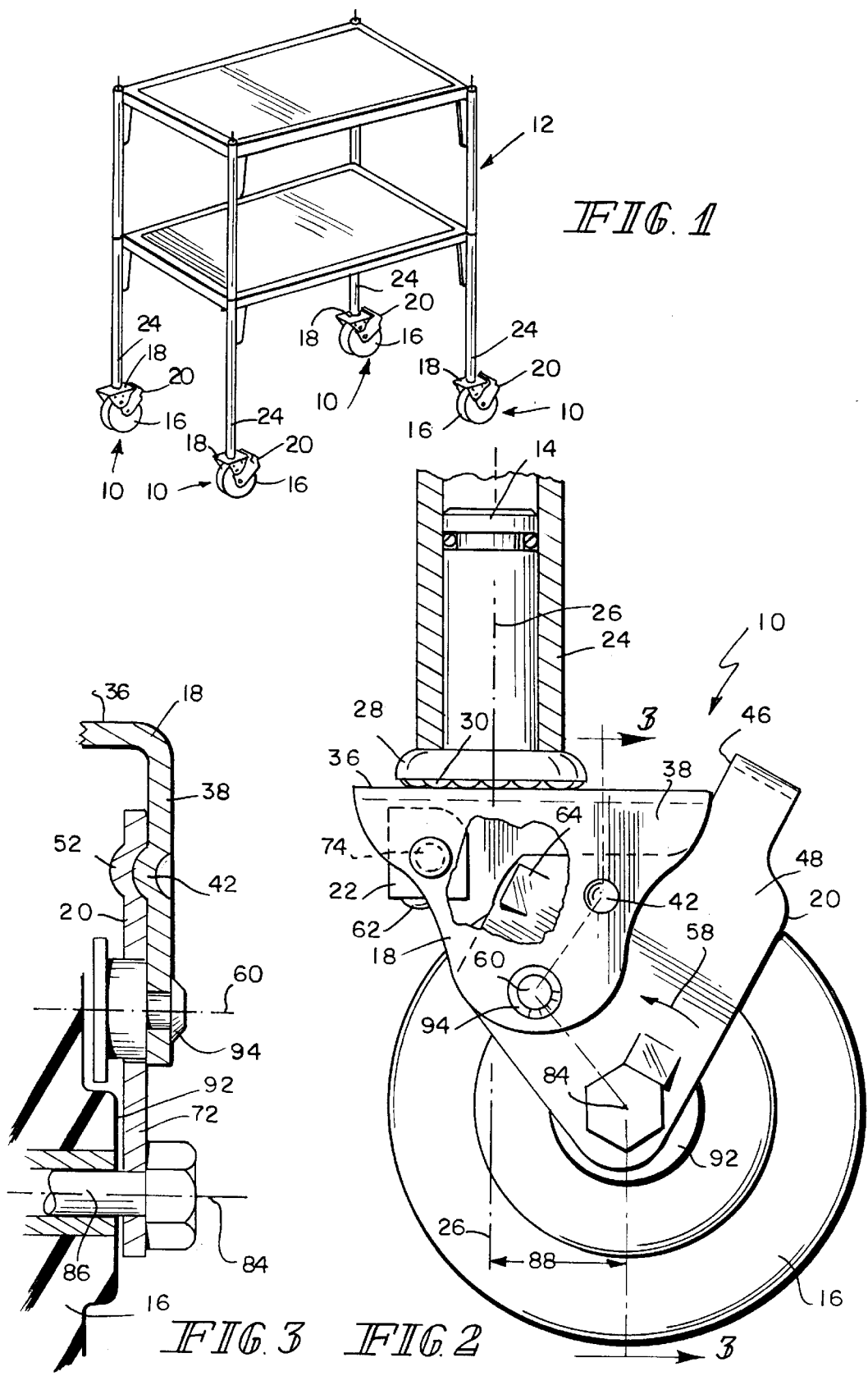

LOCKING CASTER

The present invention relates to casters that support scaffolding, equipment, and other objects and permit them to be moved by rolling movable wheels included in the casters. More particularly, the present invention relates to casters that can be locked to prevent or substantially restrict rolling movement of the wheels and unlocked to permit rolling movement of the wheels.

Casters are commonly seen on the bottom of scaffolding, equipment, and other objects which need to be moved between different locations. For example, equipment that is supported by casters can be moved (e.g. rolled) to different locations on a manufacturing floor or maintenance facility. Scaffolding that is supported by casters can be moved (e.g. rolled) to different locations at a construction site.

It is known to provide a caster that can be fastened to prevent or substantially restrict the caster from moving. This is desirable because the scaffolding can be moved to a location and then the casters can be fastened to prevent or substantially restrict the scaffolding from moving away from that location. See U.S. Pat. Nos. 5,390,761 to Perry, 4,793,438 to Perry, 4,262,774 to Chez, and 3,396,817 to Perry which show scaffolds in general.

What is needed is an improved locking caster that securely locks the caster to prevent or at least substantially restrict the caster from moving. An improved caster that securely locks the caster against movement would be welcomed by consumers.

According to the present invention, an improved caster is provided having a wheel that is rotatable about a wheel axis of rotation, a housing, a locking arm, and a locking bar. The locking arm is movable between an unlocked position to permit the wheel to rotate about its wheel axis of rotation and a locked position to prevent or substantially restrict the wheel from rotating about its wheel axis of rotation. The locking arm is linked to the wheel and connected to the housing at a pivot location so that movement of the locking arm between the locked and unlocked positions moves the wheel relative to the housing.

The locking bar is linked to the housing and includes a brake facing downwardly toward the wheel. Conventional casters have such a locking bar, but not the brake of the present invention. The brake included on the locking bar of the improved caster helps substantially in locking the wheel. When the locking arm is in the unlocked position, the brake is spaced apart from the wheel. When the locking arm is in the locked position, the brake of the locking bar engages the wheel to prevent or substantially restrict the wheel from rotating about its axis of rotation.

In preferred embodiments, the housing includes a top wall and first and second depending housing side walls. The first and second housing side walls are formed to include first and second housing detents, respectively, extending inwardly toward the locking arm. The locking arm includes spaced-apart first and second locking arm side walls formed to include first and second locking arm detents, respectively, configured to engage the first and second housing detents when the locking arm is in the unlocked position to help retain the locking arm in the unlocked position until a user wants to move the locking arm out of the unlocked position.

The first and second locking arm side walls include first and second flared portions, respectively, extending outwardly toward the first and second housing side walls, respectively. Conventional casters include locking arm side walls, but not the flared portions of the present invention. The first and second flared portions engage the first and second housing detents, respectively, when the locking arm is in the locked position to help retain the locking arm in the locked position until a user wants to move the locking arm out of the locked position. When the locking arm is in the unlocked position, the first and second flared portions are spaced apart from the first and second housing detents.

The wheel includes a raised outer surface situated adjacent to the wheel axis of rotation and the first and second locking arm side walls may further include a wheel-engaging portion that may contact the raised outer surface of the wheel when the locking arm is in the locked position. Contact between the wheel-engaging portion of the locking arm and the raised outer surface of the wheel would assist in preventing or substantially restricting the wheel from rotating about its wheel axis of rotation.

Additional objects, features, and advantages of the invention will become apparent to those skilled in the art upon consideration of the following detailed description of a preferred embodiment exemplifying the best mode of carrying out the invention as presently perceived.

BRIEF DESCRIPTION OF THE DRAWINGS

The detailed description particularly refers to the accompanying figures in which:

FIG. 1 is a perspective view of four casters supporting scaffolding so that the scaffolding can be moved between different locations;

FIG. 2 is a side elevational view of a locking caster, with portions cutaway, showing the caster including a stem for attaching to scaffolding, equipment, or other objects which the caster will support, wheel rotatable about a wheel axis of rotation, housing attached to the stem and extending over the sides of the wheel, and a locking arm situated in an unlocked position so that the wheel may rotate about its wheel axis of rotation;

FIG. 3 is an enlarged partial sectional view taken along line 3—3 of FIG. 2 showing the locking arm having a locking arm side wall and a locking arm detent formed in the locking arm side wall, the housing having a housing side wall and a housing detent formed in the housing side wall, and the locking arm detent engaging the housing detent when the locking arm is in the unlocked position to help retain the locking arm in the unlocked position until a user wants to move the locking arm out of the unlocked position;

DETAILED DESCRIPTION OF THE DRAWINGS

A set of locking casters 10 is shown in FIG. 1 attached to the bottom of a scaffold unit 12. The locking casters 10 enable scaffold unit 12 to be moved (e.g. rolled) between different locations. When scaffold unit 12 is positioned in a desired location, locking casters 10 may be locked to prevent or substantially restrict the scaffold unit 12 from moving. Locking casters 10 may also support equipment, machinery, or other objects in the same manner as scaffold unit 12.

Figures 4, 5:
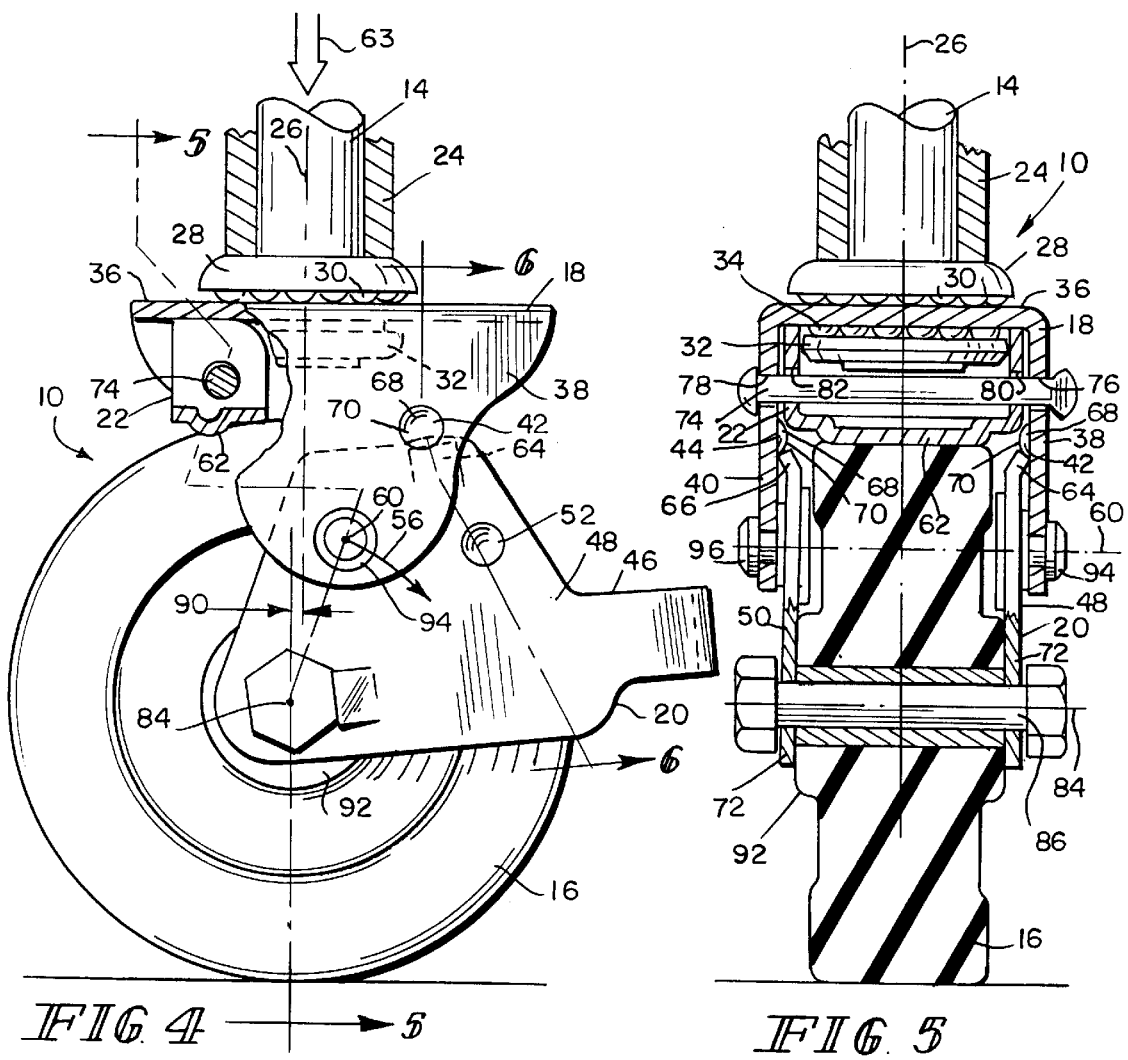
FIG. 4 is a side elevational view similar to FIG. 2, with portions cutaway, showing the locking arm in a locked position so that the wheel is pivoted relative to the housing to engage a locking bar linked to the housing, the engagement between the locking bar and the wheel prevents or substantially restricts the wheel from rotating about its wheel axis of rotation.
FIG. 5 is a sectional view taken along line 5—5 of FIG. 4 showing the locking bar being formed to include a brake configured to engage the wheel when the locking arm is in the locked position.

Locking caster 10 includes a vertically extending rotatable stem 14, wheel 16 rotatable about a wheel axis of rotation 84, housing 18, locking arm 20, and locking bar or locking device 22 as shown in FIGS. 2, 4, and 5. Rotatable stem 14 is situated within and fixed relative to a lower portion of a scaffold leg 24. When a user wants to move scaffold unit 12 in a certain direction, wheel 16 and housing 18 rotate about stem axis of rotation 26 relative to stem 14 so that wheel 16 may change direction relative to unit 12. Stem 14 extends through an upper bearing race 28 that houses ball bearings 30 and a lower bearing race 32 that houses ball bearings 34 as shown in FIGS. 2, 4, and 5. The ball bearings 30, 34 rotate on housing 18 as wheel 16 and housing 18 rotate relative to stem 14 and scaffold leg 24.

Housing 18 includes a top side 36 and spaced-apart first and second housing side walls 38, 40. Spaced-apart first and second housing side walls 38, 40 partially enclose wheel 16 as shown in FIGS. 1–5. A first housing detent 42 is formed in first housing side wall 38 and a second housing detent 44 is formed in second housing side wall 40 as shown in FIG. 5. Housing detents 42, 44 assist in the locking function of locking caster 10 as explained in greater detail below.

Locking arm 20 includes a foot pad 46 and spaced-apart first and second locking arm side walls 48, 50 as shown in FIGS. 2–6. Locking arm 20 is movable between an unlocked position, shown in FIG. 2, and a locked position shown in FIG. 4. Locking arm 20 is moved in direction 58 to situate locking arm 20 in the unlocked position as shown in FIG. 2. Locking arm 20 is moved in direction 56 to situate locking arm 20 in the locked position as shown in FIG. 4. In the unlocked position, wheel 16 is permitted to rotate about its wheel axis of rotation 84 relative to housing 18 and in the locked position, wheel 16 is prevented or at least substantially restricted from rotating about its wheel axis of rotation 84. Foot pad 46 is shaped so that a user may use his or her foot to move locking arm 20 in direction 56 from the unlocked position to the locked position.

First locking arm side wall 48 is formed to include a first locking arm detent 52 and second locking arm side wall 50 is formed to include a second locking arm detent (not shown). In the unlocked position, first locking arm detent 52 is situated in first housing detent 42, as shown in FIGS. 2 and 3, and second locking arm detent (not shown) is similarly situated in second housing detent 44. Positioning detents 42, 44, 52, (other not shown) in this manner helps keep locking arm 20 in the unlocked position until a user wants to move locking arm 20 out of the unlocked position. In the locked position, first locking arm detent 52 is spaced apart from first housing detent 42, as shown in FIG. 4, and second locking arm detent (not shown) is similarly spaced apart from second housing detent 44.

When locking arm 20 is moved in direction 56 from the unlocked position to the locked position or in direction 58 from the locked position to the unlocked position, wheel 16 is rotated about a locking arm pivot axis 60 as shown in FIGS. 2, 4, and 5. Locking arm pivot axis 60 is defined by first and second pivot pins 94, 96 as shown in FIG. 5. First pivot pin 94 extends through first housing side wall 38 and first locking arm side wall 48 and second pivot pin 96 extends through second housing side wall 40 and second locking arm side wall 50 to define locking arm pivot axis 60.

When locking arm 20 is rotated in direction 56 about locking arm pivot axis 60 from the unlocked position to the locked position, wheel 16 engages locking bar 22 as shown in FIGS. 4 and 5. Locking bar 22 includes a brake 62 facing downwardly toward wheel 16. As best viewed in FIGS. 4 and 5, the illustrative brake 62 is a concave-shaped indentation formed on locking bar 22. Brake 62 extends lengthwise approximately 1.0 in. (2.54 cm.) substantially parallel to wheel axis of rotation 84 and substantially transverse to stem axis of rotation 26. Brake 62 has a width of approximately 0.25 in. (0.63 cm.) and a depth extending downwardly toward wheel 16 of approximately 0.13 in. (0.32 cm.). A locking bar 22 with a brake 62 locks wheel 16 to prevent or at least substantially restrict wheel 16 from rotating about its wheel axis of rotation 84 substantially better than a locking bar 22 alone. In the illustrated embodiment, brake 62 is formed in locking bar 22. In alternative embodiments, a brake may be attached to a locking bar in any manner.

When locking arm 20 is in the locked position, wheel 16 engages brake 62 to prevent or substantially restrict wheel 16 from rotating about its wheel axis of rotation 84. The contact between brake 62 and wheel 16 prevents or substantially restricts wheel 16 from rotating about its wheel axis of rotation even when no weight 63 is bearing on locking caster 10. When locking caster 10 supports scaffold unit 12 or any object having weight indicated by arrow 63, the weight assists the locking function of brake 62 as shown in FIG. 5.

Locking bar 22 is rotatably appended to housing 18 by a locking bar pivot pin 74. Locking bar pivot pin 74 extends through pin-receiving apertures 76, 78 formed in first and second housing side walls 38, 40, respectively, and pin-receiving apertures 80, 82 formed in locking bar 22 as shown in FIG. 5. Brake 62 extends substantially perpendicular to locking bar pivot pin 74 as shown in FIG. 5. In the illustrated embodiment, locking bar 22 is permitted to rotate about locking bar pivot pin 74 so that brake 62 of locking bar 22 may "locate" wheel 16 when locking arm 20 is rotated in direction 56 about locking arm pivot axis 60 from the unlocked position, shown in FIG. 2, to the locked position shown in FIG. 4.

Figure 6:
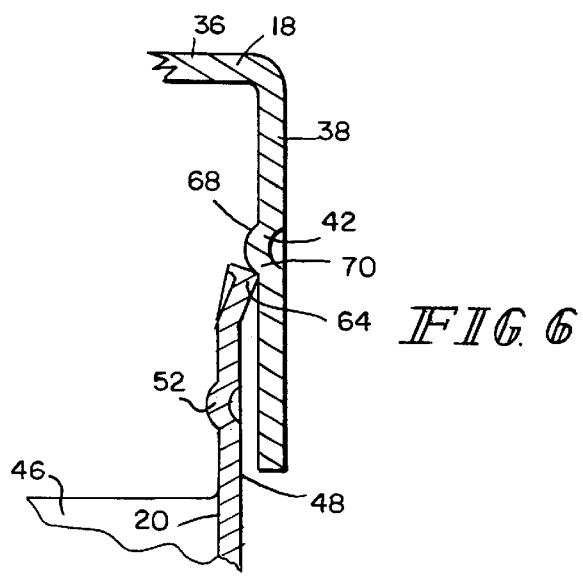
FIG. 6 is an enlarged partial sectional view taken along line 6—6 of FIG. 4 showing the locking arm side wall including a flared portion engaging the housing detent formed in the housing side wall to help retain the locking arm in the locked position until a user wants to move the locking arm out of the locked position.

First and second locking arm side walls 48, 50 are further formed to include first and second flared portions 64, 66, respectively, as shown in FIGS. 2 and 4–6. When locking arm 20 is in the locked position, first and second flared portions 64, 66 engage first and second housing detents 42, 44, respectively, as shown in FIGS. 4–6. More specifically, first and second housing detents 42, 44 include an upper portion 68 and a lower portion 70 and first and second flared portions 64, 66 engage lower portion 70 of first and second housing detents 42, 44, respectively, when locking arm 20 is in the locked position as shown in FIG. 5. When locking arm 20 is in the unlocked position, first flared portion 64 is spaced apart from first housing detent 42, as shown in FIG. 2, and second flared portion 66 is similarly spaced apart from second housing detent 44.

The contact between flared portions 64, 66 and housing detents 42, 44 provides a primary function of helping locking arm 20 remain in the locked position until a user wants to move locking arm 20 out of the locked position. The contact may also cause locking arm side walls 48, 50 to engage wheel 16 to provide a limited secondary locking function. Wheel 16 includes an outer raised portion 92 and locking arm side walls 48, 50 include a wheel-engaging portion 72 which engages outer raised portion 92 of wheel 16 when locking arm 20 is in the locked position as shown in FIG. 5. In other preferred embodiments of the present invention, the locking arm side walls do not include a wheel-engaging portion which engages an outer raised portion of the wheel.

Wheel 16 rotates about wheel axis of rotation 84 which extends in a direction transverse to stem axis of rotation 26 as shown in FIGS. 2, 4, and 5. An axle 86 extends through wheel 16 along wheel axis of rotation 84 as shown in FIGS. 3 and 5. Wheel axis of rotation 84 is offset from stem axis of rotation 26 a distance 88 when locking arm 20 is in the unlocked position as shown in FIG. 2. Wheel axis of rotation 84 is offset from stem axis of rotation 26 a distance 90 when locking arm 20 is in the locked position as shown in FIG. 4. In the locked position, wheel axis of rotation 84 is slightly offset from stem axis of rotation 26 to assist brake 62 in preventing or substantially restricting wheel 16 from rotating about its wheel axis of rotation 84.

These general types of conventional casters are known as established in the introduction of this specification. The aforedescribed caster 10 is an improvement because of the addition of brake 62 formed in locking bar 22 and flared portions 64, 66 formed in locking arm 20. These improvements, i.e. brake 62 and flared portions 64, 66, provide reliability.

In the locked position, wheel 16 is prevented or at least substantially restricted from rotating about its wheel axis of rotation 84 because wheel 16 engages brake 62 of locking bar 22. The contact between first and second flared portions 64, 66 of locking arm 20 and first and second housing detents 42, 44 of housing 18 helps retain locking arm 20 in the locked position until a user moves locking arm 20 out of the locked position.

Although this invention has been described in detail with reference to certain embodiments, variations and modifications exist within the scope and spirit of the invention as described and as defined in the following claims.

I claim:

1. A caster comprising
   a wheel rotatable about a wheel axis of rotation,
   a housing,
   a locking arm linked to the housing and movable between an unlocked position to permit the wheel to rotate about its wheel axis of rotation and a locked position to prevent or substantially restrict rotation of the wheel about its wheel axis of rotation, the locking arm supporting the wheel for rotation about the wheel axis of rotation so that movement of the locking arm between the locked and unlocked positions moves the wheel, and
   a locking bar linked to the housing, the locking bar includes a brake facing toward the wheel and engaging the wheel when the locking arm is situated in the locked position to prevent or substantially restrict rotation of the wheel about its wheel axis of rotation, the housing includes a top wall and first and second housing side walls, the first housing side wall being formed to include a housing detent extending inwardly toward the second housing side wall, the locking arm includes a locking arm side wall having a flared portion, the flared portion is engaged with the housing detent when the locking arm is in the locked position and disengaged from the housing detent when the locking arm is in the unlocked position, and the flared portion extending outwardly from the locking arm side wall and toward the housing side wall.

2. The locking caster of claim 1, wherein the the locking bar is situated between the first and second housing side walls.

3. The locking caster of claim 2, further comprising a locking bar pivot pin extending between the first and second housing side walls, the locking bar including a pin-receiving aperture, the locking bar pivot pin extends through the pin-receiving aperture, and the brake extends substantially parallel to the locking bar pivot pin.

4. The locking caster of claim 1, wherein the brake extends substantially parallel to the wheel axis of rotation.

5. The locking caster of claim 1, wherein the brake is a concave-shaped indentation formed in the locking bar.

6. The locking caster of claim 1, wherein the housing detent includes an upper portion and a lower portion and the flared portion engages the lower portion of the housing detent when the locking arm is in the locked position.

7. The locking caster of claim 6, wherein the second housing side wall is formed to include a second housing detent and the locking arm further includes a second locking arm side wall being formed to include a second flared portion situated adjacent to the second housing detent when the locking arm is in the locked position.

8. The caster of claim 6, wherein the flared portion is formed in the locking arm side wall.

9. The caster of claim 1, wherein the wheel includes an outer surface situated adjacent to the wheel axis of rotation and the locking arm includes a wheel-engaging portion that contacts the outer surface of the wheel in the locked position.

10. The caster of claim 9, wherein the wheel includes an outer raised portion and the wheel-engaging portion of the locking arm contacts the outer raised portion of the wheel in the locked position.

11. A caster comprising
    a wheel movable about a wheel axis of rotation,
    a housing including a housing side wall and a housing detent formed in the housing side wall,
    a locking device coupled to the housing, and
    a locking arm movably linked to the housing, the locking arm supporting the wheel for movement about the wheel axis of rotation between a first position wherein the wheel engages the locking device and a second position, the locking arm including a locking arm side wall and a flared portion, the flared portion being engaged with the housing detent when the locking arm is in the first position and disengaged from the housing detent when the locking arm is in the second position, and the flared portion extending outwardly from the locking arm side wall and toward the housing side wall.

12. The caster of claim 11, wherein the housing detent includes an upper portion and a lower portion and the flared portion engages the lower portion of the housing detent when the locking arm is situated in the first position.

13. The caster of claim 11, wherein the wheel includes an outer surface situated adjacent to the wheel axis of rotation and the locking arm includes a wheel-engaging portion that contacts the outer surface of the wheel in the first position.

14. The caster of claim 13, wherein the wheel includes an outer raised portion and the wheel-engaging portion of the locking arm contacts the outer raised portion of the wheel in the locked position.

15. The caster of claim 11, wherein the locking device includes a locking bar linked to the housing, the locking bar including a brake facing toward the wheel and engaging the wheel when the locking arm is situated in the first position.

16. The caster of claims 15, wherein the brake is a concave-shaped indentation formed in the locking bar.

17. The caster of claim 11, wherein the housing further includes a second housing side wall formed to include a second housing detent and the locking arm further includes a second locking arm side wall formed to include a second flared portion, the second flared portion is engaged with the second housing detent when the locking arm is situated in the first position and disengaged from the second housing detent when the locking arm is situated in the second position.

18. The caster of claim 11, wherein the flared portion is formed in the locking arm side wall.

\* \* \* \* \*